June 4, 1929.  N. GEORGEVITCH  1,716,225
ELASTIC COUPLING
Filed June 23, 1927
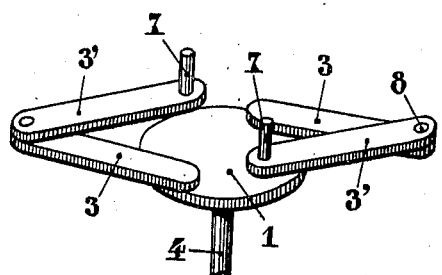
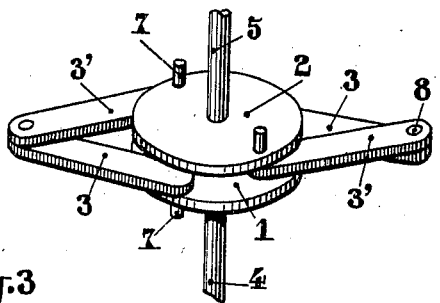
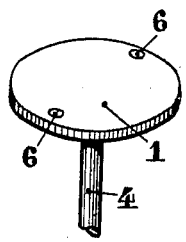
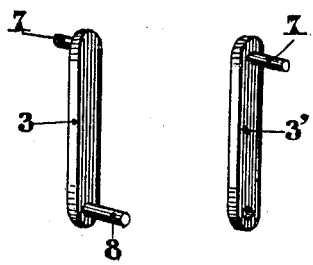
INVENTOR
Nicolas Georgevitch
by
Langner, Parry, Card and Langner
Att'ys.

Patented June 4, 1929.

1,716,225

UNITED STATES PATENT OFFICE.

NICOLAS GEORGEVITCH, OF PARIS, FRANCE.

ELASTIC COUPLING.

Application filed June 23, 1927, Serial No. 200,975, and in France December 8, 1926.

The direct coupling of electric or other motors to machines or tools of which the resistance couple varies (wood working machines operating on wood with knots, automatic hammers, compressors and so forth) generally have serious drawbacks. The sudden increase of this couple may, in the case of an electric motor for example, produce abnormal currents in the field or armature which may damage the motor and render it completely useless. For this reason it has frequently been necessary to interpose between the motor and the machine or tool, a pliant transmission such as a belt which when the resistance couple suddenly increases, slips on the pulleys and thus prevents damage to the motor.

The present invention has for its object an elastic coupling by which a motor may be coupled directly to a machine or tool of which the resistance couple varies. This coupling is essentially characterized by the combination:

1. Of two plates of which one is secured to the driving shaft whilst the other is secured to the driven shaft, the axes of these two shafts being co-axial.

2. Of a hinged system arranged between these two plates and formed of two or more pairs of arms, the pivot points of the arms on the plates being regularly arranged along a circumference, and the arm of one pair being connected at its end to the other arm of the same pair by a hinged connection.

This hinged system placed between the two plates permits, by reason of its possible deformation, of one of the plates turning temporarily faster than the other plate. The system may then return to its normal position after the peak of the resistance couple has been reached by reason of the action of centrifugal force acting on the said arms.

In the drawing there is illustrated diagrammatically and by way of example one form of construction in accordance with the invention.

Figure 1 is a perspective view of the elastic coupling forming the subject of the invention.

Figure 2 is a similar view, one of the plates being removed.

Figure 3 is a perspective view of one of the plates forming a part of the coupling.

Figures 4 and 5 show in perspective the two arms which form an element of the hinged system placed between the two plates.

In accordance with the invention the coupling is composed essentially of two plates 1 and 2 and of two or more pairs of arms 3, 3′. The plate 1, for example, is secured to the driving shaft 4, whilst the other plate, the plate 2, is secured to the driven shaft 5, the axes of the shafts 4 and 5 being in alignment and co-axial with one another. Each of theses plates is provided with holes 6 which are diametrically oppositely disposed (Figure 3) in cases where only two pairs of arms 3, 3′ are used or four, six or more similar holes are used when four, six or more pairs of arms are used. Into these holes are fitted pivots 7 carried at one of the ends of each of the arms 3, 3′. Each pair of arms is provided at its other end with a common axis of rotation 8. These groups of arms thus form a hinged system which can be opened, as shown in Figures 1 and 2, or closed.

The operation of such a device will be readily understood. Assuming the entire system is rotating, the shafts 4 and 5 turning at the same speed, the arms, under the action of centrifugal force to which they are subjected, tend to move along extensions of the radii of the plates. The arms 3 and 3′ of each group therefore tend to coincide, the hinged system being thus closed.

If a resistance couple applied to the shaft 5 increases, the speed of this shaft tends to diminish. By reason of the device forming the subject of the invention the driving shaft can continue to rotate at the same speed as the difference in speed between the two shafts simply produces a de-formation of the hinged system. In this manner any deleterious re-percussion in the field or armature of the electric motor for example, is eliminated. When the resistance couple applied to the shaft 5 returns to its normal value, the two shafts 4 and 5 again rotate at the same speed when the arms 3, 3′ will again coincide by reason of the centrifugal force as explained above.

When the coupling device, forming the subject of the invention, is applied to a machine wherein driving and resistance couples of high value come into operation, it is possible, in order to avoid the necessity of using arms which are too long and consequently too cumbersome, to reduce (relatively to the dimensions of the plate) the length thereof and to place at their ends masses so as to impart to the whole system the necessary mass for obtaining sufficient rapid closing of the hinged system after passing the peak due to the variations of the resistance couple.

It will be understood that the pivots 7 and 8 which are mounted with slight friction so as not to obstruct the deformation of the hinged system, may be replaced by ball bearings for the purpose of increasing the mobility and smoothness of the system. Moreover the invention is not limited to the device described above and illustrated in the accompanying drawing. It may be modified in details of construction without departing from the scope. For example any number of pairs of arms may be used, either an even number or an uneven number of pairs.

Having thus described my invention, what I claim as new and desire to secure by Letters Patent is:—

A coupling for the absorption of periodic torque inequalities comprising driving and driven members axially alined and relatively rotatable, pairs of links symmetrically arranged about said axis, the links of each pair being pivotally articulated at their outer ends, the inner ends of the links of each pair being directly connected, the one to the driving member and the other to the driven member at such distances apart when under uniform torque stress that the links of each pair form an acute angle, said links being operable in opposition to the centrifugal force engendered by rotation of said driving and driven members to vary the angles formed by said pairs of links through temporary relative displacement of said driving and driven members under the influence of variable torque stresses.

NICOLAS GEORGEVITCH.